(12) United States Patent
Warner

(10) Patent No.: US 10,969,923 B2
(45) Date of Patent: Apr. 6, 2021

(54) SYSTEM AND METHOD FOR PROVIDING A CUSTOMISABLE GRAPHICAL USER INTERFACE FOR INFORMATION TECHNOLOGY ASSISTANCE

(71) Applicant: Invarosoft Pty Ltd, New South Wales (AU)

(72) Inventor: Jamie Warner, New South Wales (AU)

(73) Assignee: Invarosoft Pty Ltd, New South Wales (AU)

( * ) Notice: Subject to any disclaimer, the term of this patent is extended or adjusted under 35 U.S.C. 154(b) by 0 days.

(21) Appl. No.: 15/726,311

(22) Filed: Oct. 5, 2017

(65) Prior Publication Data
US 2018/0101390 A1    Apr. 12, 2018

(30) Foreign Application Priority Data
Oct. 6, 2016    (AU) .................................. 2016904063

(51) Int. Cl.
*G06F 3/0481*    (2013.01)
*H04L 29/08*    (2006.01)
(Continued)

(52) U.S. Cl.
CPC ........ *G06F 3/0481* (2013.01); *G06F 3/04817* (2013.01); *G06F 9/451* (2018.02);
(Continued)

(58) Field of Classification Search
CPC .... G06F 9/451; G06F 3/0488; G06F 3/04817; G06F 3/0482; G06F 3/0481; G06F 8/60;
(Continued)

(56) References Cited

U.S. PATENT DOCUMENTS 9,465,598 B2 * 10/2016 Frank ........................ G06F 8/61
2009/0063175 A1 * 3/2009 Hibbets ............. G06F 17/30867
705/16

(Continued)

FOREIGN PATENT DOCUMENTS

WO    WO 2001/067286    9/2001

OTHER PUBLICATIONS

"Helpshift—Mobile App FAQ, CRM, & Customer Support," Jul. 31, 2014, https://www.youtube.com/watch?v=104sbm-E7J8, 10 pages (Year: 2014).*

(Continued)

*Primary Examiner* — Nicholas Ulrich
(74) *Attorney, Agent, or Firm* — Martin & Ferraro, LLP

(57) ABSTRACT

A system for providing information technology (IT) assistance packages enables a graphical user interface that can be launched from a single application icon and that can be customised on an individual user basis to provide a locally-branded system for servicing the user's IT needs. The system includes: a networked plurality of computer processors; computer memory operatively connected to the networked plurality of computer processors, wherein the memory stores computer program code that when executed by the processors is operable for: providing, via a first entity, a software application to a second entity, wherein the software application defines an end user graphical user interface; customising, via the second entity accessing a web portal of the first entity, the graphical user interface; providing, via the second entity, the software application to a third entity device, whereby the software is resident on the third entity device; executing, via the third entity device, the software application, wherein the software application is executed by an executable icon for launching the end user graphical user interface; generating, via the end user graphical user interface, a service request; and lodging, via the third entity device, the service request with the second entity.

17 Claims, 10 Drawing Sheets

(51) Int. Cl.
- H04L 12/24 (2006.01)
- G06F 9/451 (2018.01)
- G06Q 30/00 (2012.01)
- G06F 3/0488 (2013.01)
- G06F 3/0482 (2013.01)

(52) U.S. Cl.
CPC ....... G06Q 30/016 (2013.01); H04L 41/5064 (2013.01); H04L 41/5074 (2013.01); H04L 67/34 (2013.01); G06F 3/0482 (2013.01); G06F 3/0488 (2013.01); H04L 67/10 (2013.01)

(58) Field of Classification Search
CPC ..... G06F 8/61; G06Q 30/016; H04L 41/5074; H04L 67/10; H04L 41/5061; H04L 41/5064

See application file for complete search history.

(56) References Cited

U.S. PATENT DOCUMENTS

| | | | | |
|---|---|---|---|---|
| 2011/0145789 A1* | 6/2011 | Rasch | ................. | G06F 9/44505 717/121 |
| 2013/0103973 A1* | 4/2013 | Werth | ................... | G06F 9/5072 714/2 |
| 2013/0159993 A1* | 6/2013 | Misovski | ................. | G06F 8/61 717/177 |
| 2016/0013993 A1* | 1/2016 | Chan | .................... | H04L 67/125 370/216 |
| 2016/0171419 A1* | 6/2016 | Zhang | ............ | G06Q 10/063112 705/7.14 |

OTHER PUBLICATIONS

"Helpshift—In App Mobile Help Desk & Support," Jul. 31, 2014, https://www.youtube.com/watch?v=rBKTqa7CFGI, 7 pages (Year: 2014).*

International-type search for provisional patent application of AU 2016904063, issued by Australian Patent Office, dated Jul. 25, 2017, 10 pgs.

DeskPRO, 'DeskPRO Administration Documentation Documentation Release 1.0', [retrieved from Internet on Jul. 24, 2017] <URL: https://web.archive.org/web/20160731044558/https://manuals.deskpro.com/pdf/admin/admin.pdf> published on Jul. 31, 2016 as per Wayback Machine.

Zoho Corporation Pvt. Ltd., 'ManageEngine ServiceDesk Plus User Guide', 2012, [retrieved from Internet on Jul. 24, 2017] <URL:https://download.manageengine.com/products/service-desk/help/ManageEngine_ServiceDeskPlus_8.1_Help_UserGuide.pdf.

* cited by examiner

SYSTEM AND METHOD FOR PROVIDING A CUSTOMISABLE GRAPHICAL USER INTERFACE FOR INFORMATION TECHNOLOGY ASSISTANCE

CROSS-REFERENCE TO RELATED APPLICATIONS

This application claims priority to and the benefit of Australian Patent Application No. 2016904063 filed on Oct. 6, 2016, the entire contents of which are incorporated herein by reference.

FIELD OF THE INVENTION

The present invention relates to a system and method for providing information technology assistance. In particular, the present invention relates to a system for providing a customisable end user graphical user interface, of a native application of an end user device, for providing IT assistance. However, it will be appreciated that the system can be used in other areas.

BACKGROUND TO THE INVENTION

A recent trend in information technology (IT) help services is to reduce help desk traffic by promoting direct access to the Internet as a better way for customers, and for example employees within a corporation, to access information regarding IT help services. The Internet is particularly suited for this because of its global reach and relatively easy accessibility.

One Internet based method of providing customer service is by posting a question in a Question and Answer (Q&A) list, and waiting until either service personnel or other customers provide an answer by posting it to the same Q&A list. The answer may or may not be correct.

Another Internet based customer service solution is posting a large frequently asked questions (FAQ) list that answers most common questions.

However, while using the Internet often reduces costs, for most prior art systems it also reduces customer satisfaction. The customer may not feel that he or she is receiving individual attention. Furthermore, there is no assurance that an answer to a particular question is correct for the specific situation in which the customer finds himself or herself.

Another method of providing more interactive customer service on the Internet is a web based help-desk implemented through a web browser, such as the system described in international patent application publication no. WO 01/67286. The customer logs on to a help page that is separate from the area in which the customer had trouble. The customer then fills out a help request, including answering a series of questions regarding the problem. While the customer is connected to this help page on the Internet, the customer's computer system may send configuration information to service technicians. The service technicians evaluate the data from the computer and the help request. The service technicians then call the customer to discuss the problem.

However, the above solution sometimes requires a similar amount of help desk traffic, effort and costs as a direct telephone number help desk. Additionally, filling out the help request is a chore that often takes considerable time. Furthermore, some customers do not like having the contents of their personal computers surveyed, especially if at least some sections of that computer are not relevant to the problem, and contain private information. In addition, the customer must leave the web page on which he or she encountered the problem to log on to the help page to start this help process. This interrupts normal work, and can be a hassle.

There is therefore a need for an improved system and method for providing a customisable graphical user interface for information technology assistance.

Reference to background art herein is not to be construed as an admission that such art constitutes common general knowledge.

OBJECT OF THE INVENTION

It is a preferred object of the present invention to provide an IT helpdesk package that addresses, or at least ameliorates one or more of the aforementioned problems of the prior art and/or provides a useful commercial alternative.

Other preferred embodiments of the present invention will become apparent from the following description.

SUMMARY OF THE INVENTION

According to a first aspect, the invention is a system for providing IT assistance packages, the system comprising:
a networked plurality of computer processors;
computer memory operatively connected to the networked plurality of computer processors, wherein the memory stores computer program code that when executed by the processors is operable for:
providing, via a first entity, a software application to a second entity, wherein the software application defines an end user graphical user interface;
customising, via the second entity accessing a web portal of the first entity, the end user graphical user interface;
providing, via the second entity, the software application to a third entity device, whereby the software application is resident on the third entity device;
executing, via the third entity device, the software application, wherein the software application is executed by an executable icon for launching the end user graphical user interface;
generating, via the end user graphical user interface, a service request; and
lodging, via the third entity device, the service request with the second entity.

Preferably, the first entity is a first computer system.
Preferably, the second entity is a second computer system.
Preferably, the third entity device is an end user computing device.
Preferably, the system further comprises:
providing, via the second entity, a link to a knowledge database to the third entity device.
Preferably, the service request includes:
a ticket type;
user information;
an attachment; and
an issue description.
Preferably, the end user graphical user interface includes one or more selectable buttons.
Preferably, the end user graphical user interface includes at least one of:
customisable buttons;
customisable news articles;
customisable app buttons;
a customisable banner; and
a customisable colour scheme.

According to a second aspect, the invention is a method comprising:

provrviding, via a first entity, a software application that defines an end user graphical user interface to a second entity;

customising, via the second entity accessing a web portal of the first entity, the end user graphical user interface;

providing, via the second entity, the software application to a third entity device, whereby the software is resident on the third entity device;

executing, via the third entity device, the software application, wherein the software application is executed by an executable icon for launching the end user graphical user interface;

generating, via the end user graphical user interface, a service request; and lodging, via the third entity device, the service request with the second entity.

Preferably, the service request automatically identifies the user computing device.

BRIEF DESCRIPTION OF THE DRAWINGS

By way of example only, preferred embodiments of the present invention will be described more fully hereinafter with reference to the accompanying figures, wherein like reference numerals refer to like integers, in which.

Figure 1:
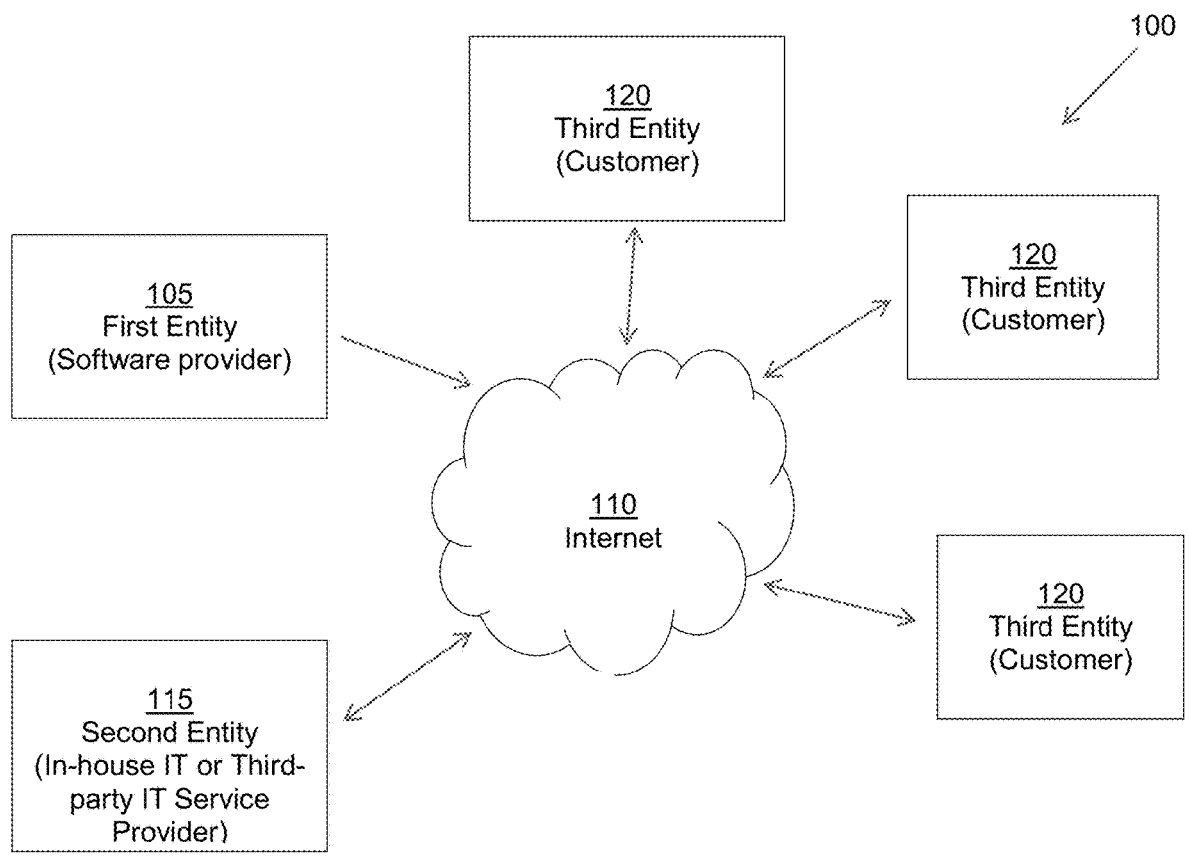
FIG. 1 is a flow diagram of a system for providing an IT assistance package, according to some embodiments of the present invention.

Those skilled in the art will appreciate that minor deviations from the symmetrical layout of components as illustrated in the drawings will not detract from the proper functioning of the disclosed embodiments of the present invention.

DETAILED DESCRIPTION OF THE PREFERRED EMBODIMENT

Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this specification, adjectives such as first, second and third, left and right, top, bottom and side, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

According to a first aspect, the present invention is defined as a system for providing IT assistance packages. The system comprises a first entity providing a software application to a second entity, such as an in-house IT support group or third-party IT service provider, wherein the software application defines an end user graphical user interface. The end user graphical user interface of the software application is wholly customisable by the second entity, so that the software application appears to be a product made and operated by the second entity. The system further comprises the second entity providing the software application to a third entity device, such as the smartphone device of an end user in a company. In use, the third entity device executes the software application to launch the end user graphical user interface and lodge a service request with the second entity.

FIG. 1 is a diagram of a system 100 for providing a customisable IT assistance package, according to some embodiments of the present invention. For example, the software application (not shown) can reside on a server or computer of a first entity 105 of a business that is connected to the Internet 110. The first entity 105 provides the software application to a second entity 115, such as an in-house IT team or third-party IT service provider. The software application includes a customisable, end user graphical user interface (GUI) that can be customised by the second entity 115 to include particular colours, logos and insignia associated with the second entity, as well as the ability to customise various buttons and functions of the graphical user interface.

Once the second entity 115 has customised the end user graphical user interface, the second entity 115 provides the software application to a third entity 120, typically defined by end users or customers.

To better illustrate the features of the present technology, consider a situation where a large company with an in-house IT department and hundreds of employees wishes to streamline their IT assistance system and reduce the number of physical visits and/or phone calls to the IT department. The system 100 can be deployed by the software application developer to the in-house IT department. The in-house IT department then customises the graphical user interface of the software application to include the company's name, logo and colours. The in-house IT department then installs the customised software application on each employee's computer. Advantageously, the end user graphical user interface can be customised on an individual user or client basis to provide an optimal system for servicing individual departments' and users' needs.

Once installed, any time an employee encounters a problem or requires assistance, the employee can conveniently request assistance from the in-house IT department by launching the software application and navigating directly through the end user graphical user interface to lodge a service request. Advantageously, the software application can be installed on a number of employee devices such as desktops, laptops, tablets and smartphones so that the service request can be conveniently lodged from the relevant device.

The second entity 115 receives requests in real time from various sources to rapidly and efficiently log and organise service requests. A service request can be made up of one or more requests relevant to a user, such as difficulties using new software or dealing with an error in a software application. The in-house IT department can then utilise the system 100 to quickly and efficiently receive, schedule and attend to each of the service requests.

Figure 2:
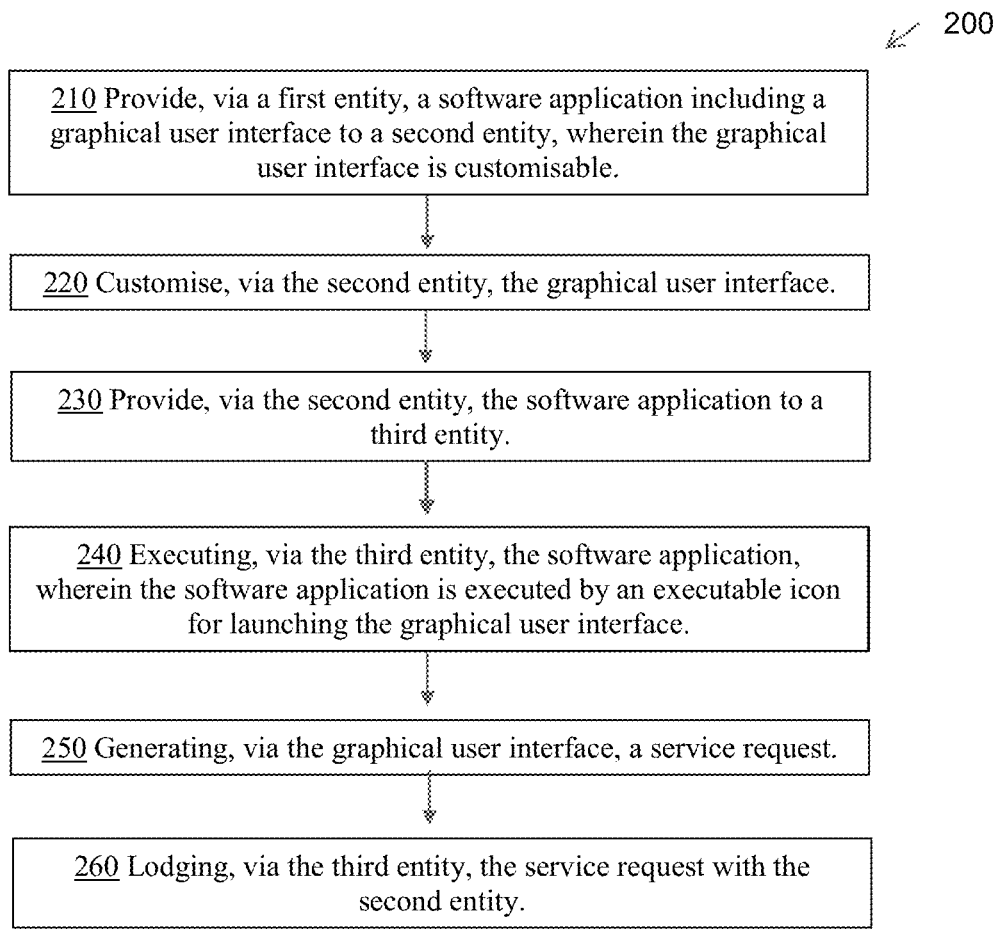
FIG. 2 is a diagram of a network for receiving service requests in an electronic system, according to some embodiments of the present invention.

By receiving requests in the form of an electronic service request from user computing devices, the number of physical visits and phone calls made to IT departments can be significantly reduced, and better organisation and allocation of resources can be achieved through electronic scheduling. FIG. 2 is a block diagram of a method 200 for lodging a service request in an electronic system, such as the system 100, according to an embodiment of the present invention. The method 200 comprises providing, via a first entity, a software application including a customisable, end user graphical user interface to a second entity, such as an administrator computing device, at step 210. At step 220, the method further comprises the second entity customising, using a web portal of the first entity, the end user graphical user interface. At step 230, the second entity provides the software application to a third entity device, whereby the software is resident on the third entity device. At step 240, the third entity device executes the software application, wherein the software application is executed by an executable icon for launching the end user graphical user interface. At step 250, the method further comprises generating a service request via the end user graphical user interface. The end user graphical user interface allows a user to input information specific to the error or request. For example, the service request can include a request to address a flickering screen on a computer or assistance using a new software application. At step 260, the third entity device lodges the service request with the second entity. The service request is logged in the administrator computing device so that time and resources for effectively responding to the request can be allocated appropriately.

Generally, the service request automatically identifies the user computing device, thus avoiding the need for the user to separately login to a web page or otherwise provide identifying details.

Figure 3:
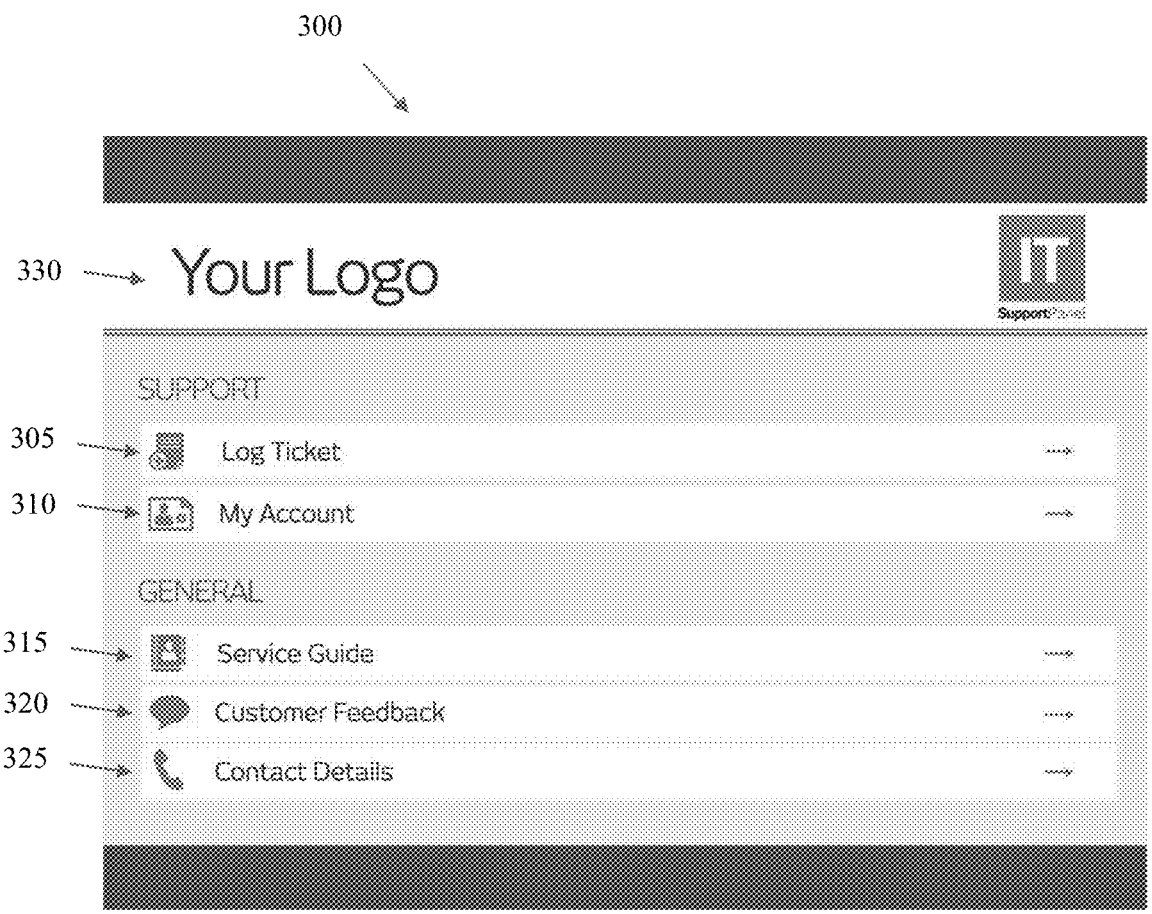
FIG. 3 illustrates a graphical user interface, in accordance with the system shown in FIG. 1.

FIG. 3 is an example of an end user graphical user interface (GUI) 300 in accordance with the method 100 described in FIG. 1. As shown, the GUI 300 includes a customised button 305 labelled "Log Ticket" that is user selectable and allows a user to complete a form (shown in FIG. 4) for submitting a service request to an IT administrator or help desk. A shortcut to the customised button 305 generally will be located, for example, on a user's computer desktop or smartphone application launch screen.

The GUI 300 can also include additional buttons to provide further functionality. For example, the GUI 300 can include a button 310 labelled "My Accounts" which can lead a user to an additional GUI (not shown) for managing a user account. Further examples are illustrated by buttons 315, 320 and 325 labelled "Service Guide", "Customer Feedback" and "Contact Details", respectively. These buttons 315, 320, 325 can lead a user to various further GUIs that can display information such as direct contact details for an IT department or provide a feedback page. For example, the further GUIs can display the IT department's email address and direct telephone number.

While the buttons 305, 310, 315, 320, 325 shown on the GUI 300 are specifically labelled, a person skilled in the art will appreciate that the buttons are purely illustrative and can be customised to take various forms and perform various functions as desired by a user.

GUI 300 further includes section 330 which can be edited and customised to display various logos and company colours or insignia. For example, the banner labelled "Your Logo" can be customised to include the name, branding insignia and trade marks of a particular company, such as "XYZ Accounting Inc." and including pink and red stripes. The GUI 300 after customisation thus appears to be the product of the company or organisation that is providing the GUI 300 to its employees or members.

Figure 4:
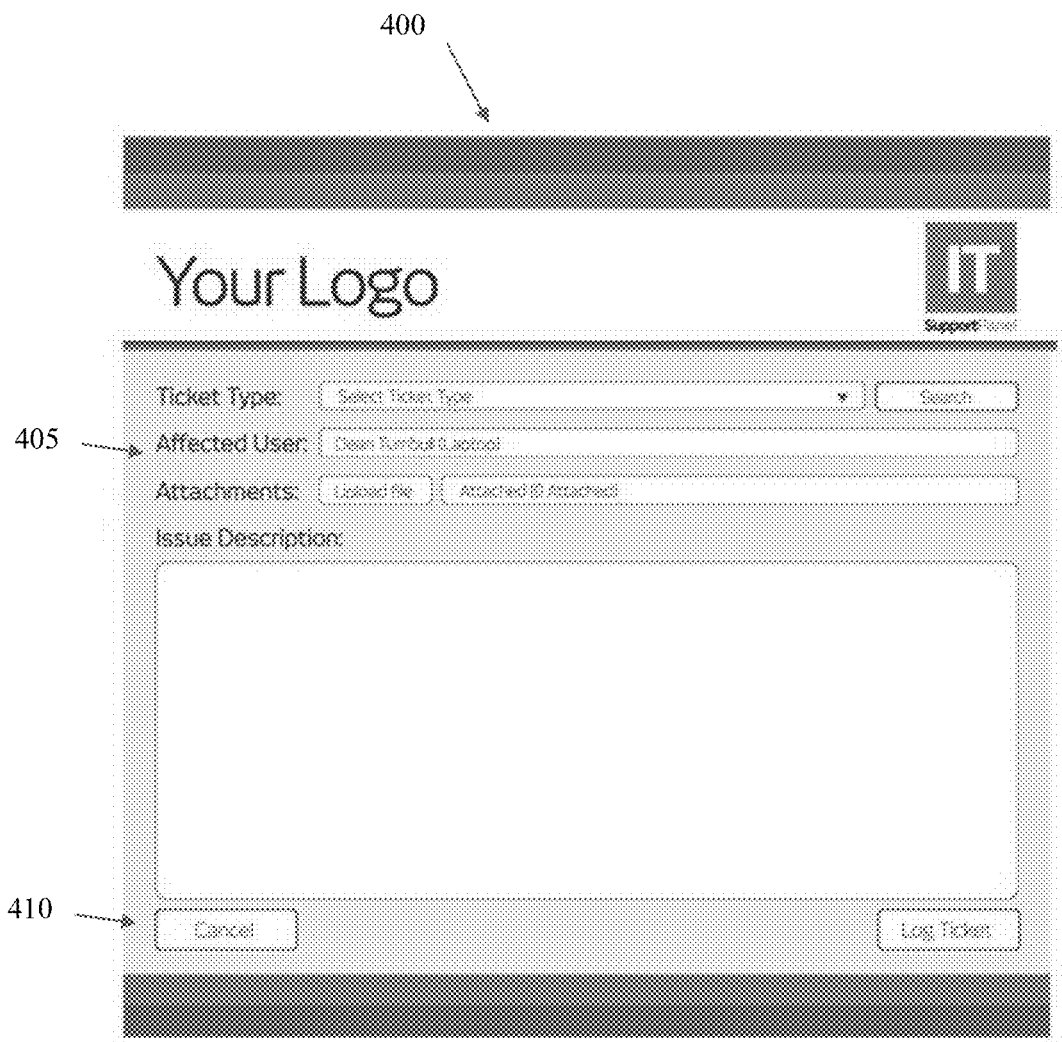
FIG. 4 illustrates a graphical user interface for lodging a service request, in accordance with the system shown in FIG. 1.

FIG. 4 is an example of an end user graphical user interface (GUI) 400 for submitting a service request in accordance with the system in FIG. 1. As shown, the GUI 400 includes a section 405 which provides fields for receiving information relating to a service request. In the illustrated embodiment, the GUI 400 includes fields for "Ticket Type", "Affected User", "Attachments" and "Issue Description". However, a person skilled in the art will appreciate that the section 405 of the interface 400 can be tailored and customised to display a range of fields relevant for receiving information relating to a particular service request. Section 410 illustrates an interactive mechanism for a user to submit a service request and thereby log a ticket, or cancel the service request, as indicated by the buttons "Cancel" and "Log Ticket". If a user chooses to log the service request ticket, the software application sends the information provided in section 405 to the administrator computing device for processing and logging.

Figure 5:
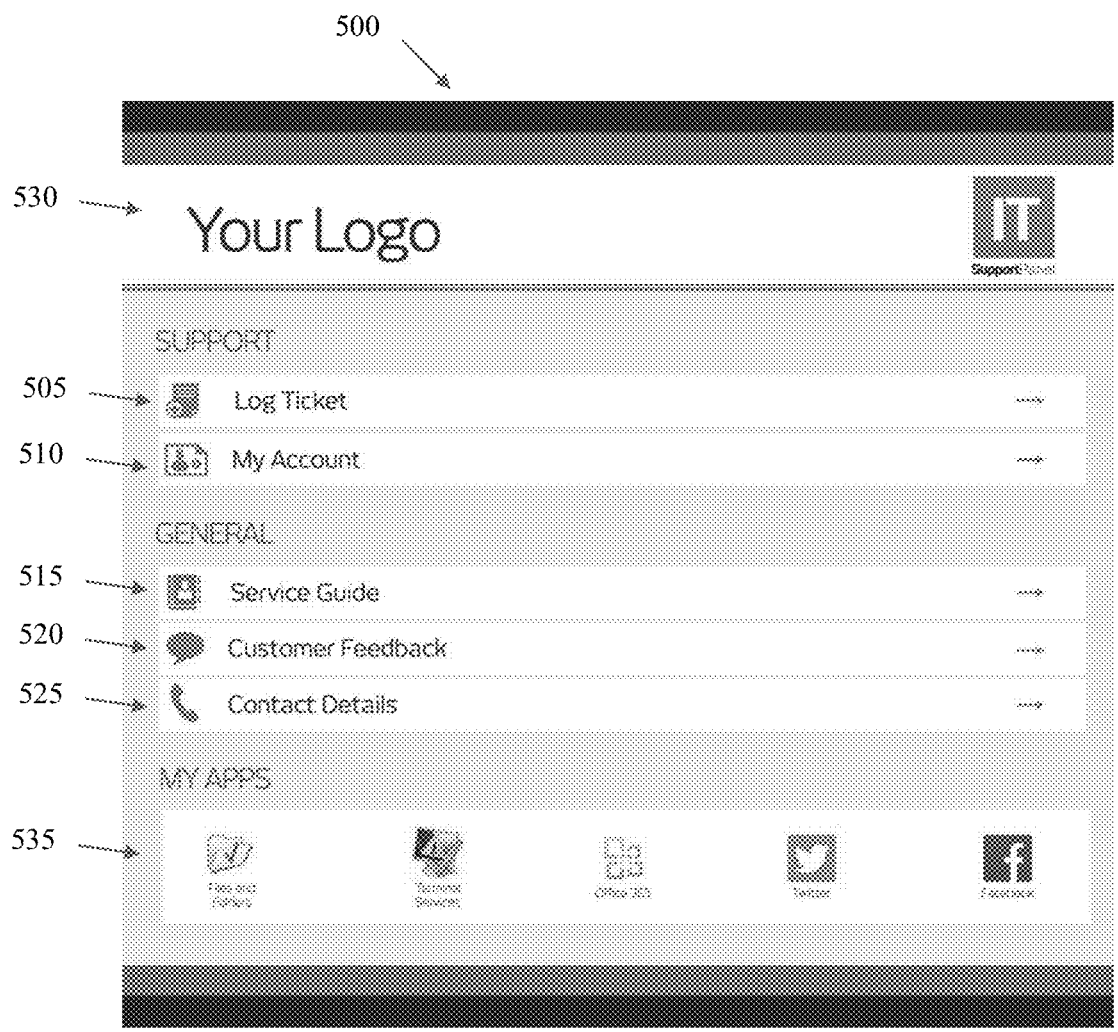
FIG. 5 illustrates an alternative graphical user interface, in accordance with the system shown in FIG. 1.

FIG. 5 is an example of an end user graphical user interface (GUI) 500 for submitting a service request in accordance with the method in FIG. 1. Similar to the GUI 300 shown in FIG. 3, GUI 500 includes buttons 505 and 510 labelled "Log Ticket" and "My Account", respectively.

Further GUI 500 includes buttons 515, 520 and 525 labelled "Service Guide", "Customer Feedback" and "Contact Details", respectively. While the buttons shown on the GUI 500 are specifically labelled, a person skilled in the art will appreciate that the buttons illustrated are purely illustrative and can be customised to take various forms and functions as desired by a user.

Similar to GUI 300, GUI 500 includes section 530 which can be edited and customised to display various logos, trade marks and company colours or insignia.

GUI 500 includes an additional app section 535 which can be customised to display commonly used or important applications for a user. For example, the app section 535 can include links to Microsoft Office applications such as Word or Excel, Facebook and various files and folders located on the user computer or network. Advantageously, the user can quickly find applications and folders without having to manage a cluttered desktop display.

Figure 6:
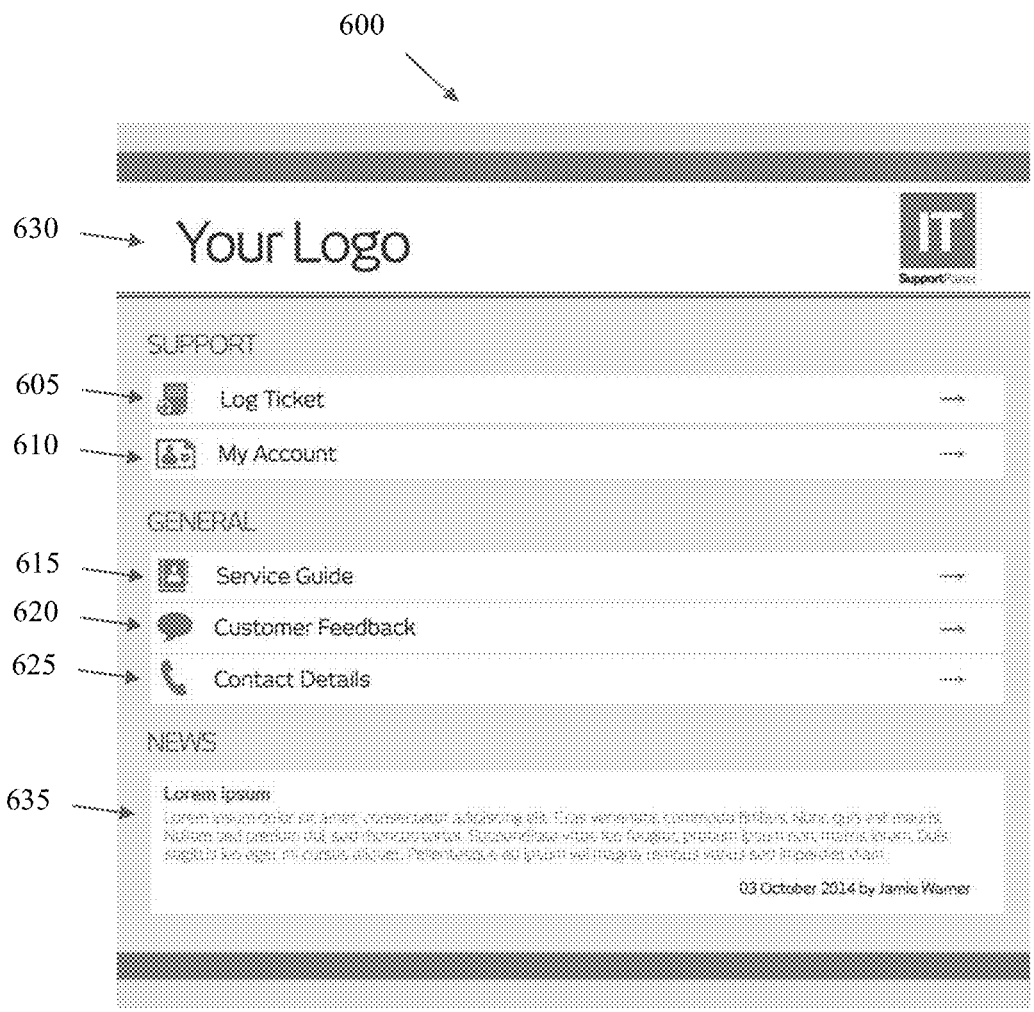
FIG. 6 illustrates a further graphical user interface, in accordance with the system shown in FIG. 1.

FIG. 6 is an alternative embodiment of an end user graphical user interface (GUI) 600 for submitting a service request in accordance with the method in FIG. 1. Similar to the GUI 300 shown in FIG. 3, GUI 600 includes buttons 605 and 610 labelled "Log Ticket" and "My Account", respectively.

Further, GUI 600 includes buttons 615, 620 and 625 labelled "Service Guide", "Customer Feedback" and "Contact Details", respectively.

Further, similar to GUI 300, GUI 600 includes section 630 which can be edited and customised to display various logos, trade marks and company colours or insignia.

GUI 600 includes an additional newsfeed section 635 which can be customised to display news such as upcoming system changes or a rolling news feed.

Figure 7:
FIG. 7 illustrates another alternative graphical user interface, in accordance with the system shown in FIG. 1.

FIG. 7 is an alternative embodiment of an end user graphical user interface (GUI) 700 for submitting a service request in accordance with the method in FIG. 1. Similar to the GUIs 500 and 600 shown in FIGS. 5 and 6 respectively, GUI 700 includes buttons 705 and 710 labelled "Log Ticket" and "My Account", respectively.

Further, GUI 700 includes buttons 715, 720 and 725 labelled "Service Guide", "Customer Feedback" and "Contact Details", respectively.

Further, similar to GUI 500 and 600, GUI 700 includes section 730 which can be edited and customised to display various logos, trade marks and company colours or insignia.

GUI 700 also includes a newsfeed section 735, which can be customised to display news such as upcoming system changes or a rolling news feed, similar to GUI 600 in FIG. 6.

Similar to GUI 500, GUI 700 includes an additional app section 740, which can be customised to display commonly used or important software applications for a user. For example, the apps section 740 can include links to Microsoft Office applications, Facebook and various files and folders located on the user computer or network. Advantageously, the user can quickly launch an application from the GUI 700.

Figure 8:
FIG. 8 illustrates a software application installed on a computing device, in accordance with the system shown in FIG. 1.

FIG. 8 illustrates an example of an application executable icon 800 which launches an end user GUI on a device of a client of an IT provider or an end user of an IT department, such as a smartphone 805. The smartphone 805 can include devices running operating systems such as Windows, Android or iOS. Alternatively, the application can be installed and executed on a PC such as a computer or laptop running Windows or OSX, or any other appropriate operating system. As shown, the application executable icon 800 can be displayed on a smartphone 805 and selected/activated by a user to execute an application, which is resident on the smartphone 805, and launch the GUI, such as any of the GUIs 300, 400, 500, 600, 700 illustrated in FIGS. 3-7.

Figure 9:
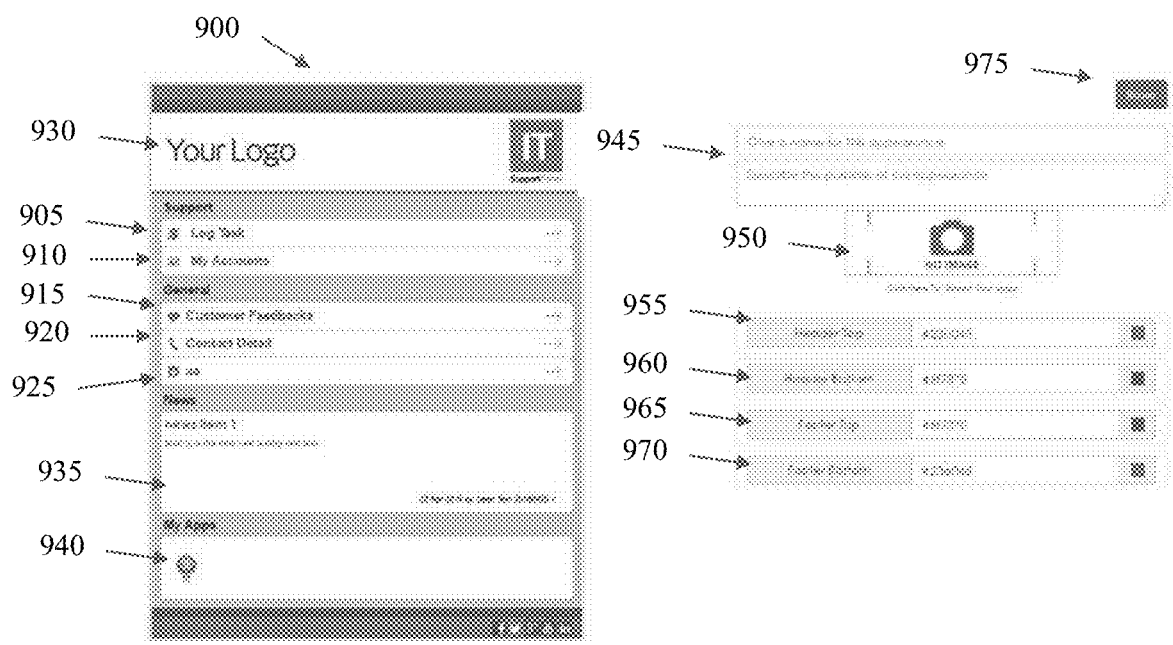
FIG. 9 illustrates another alternative graphical user interface including a menu for customising various features of the graphical user interface, in accordance with the system shown in FIG. 1.

FIG. 9 is another alternative embodiment of an end user graphical user interface (GUI) 900 for submitting a service request in accordance with the method in FIG. 1. GUI 900 further includes a menu for customising various features of the GUI 900. Similar to the GUI 700 shown in FIG. 7, GUI 900 includes buttons 905 and 910 labelled "Log Task" and "My Accounts", respectively.

Further, GUI 900 includes buttons 915, 920 and 925 labelled "Customer Feedback", "Contact Detail" and "aa", respectively. A person skilled in the art will appreciate that the buttons illustrated are purely illustrative and can be customised to take various forms and functions as desired by a user.

GUI 900 further includes section 930 which can be edited and customised to display various logos and company colours or insignia.

GUI 900 also includes a news section 935 an app section 940, similar to those described above in relation to FIG. 7.

GUI 900 further includes a menu for customising the appearance of GUI 900. The menu of GUI 900 includes an input section 945 for labelling and describing a name and purpose of a particular customised interface. For example, a company XYZ Computing Inc. can choose to label a particular interface "XYZ Computing Inc." so that users utilising the GUI 900 will see a particular customised appearance.

A company logo or image can also be provided in section 950 and sections 955, 960, 965 and 970 to allow an administrator to select particular colours to achieve the desired appearance for the GUI 900.

Once the desired appearance for the GUI 900 has been achieved, the administrator can save the particular design by selecting "save" button 975.

Figure 10:
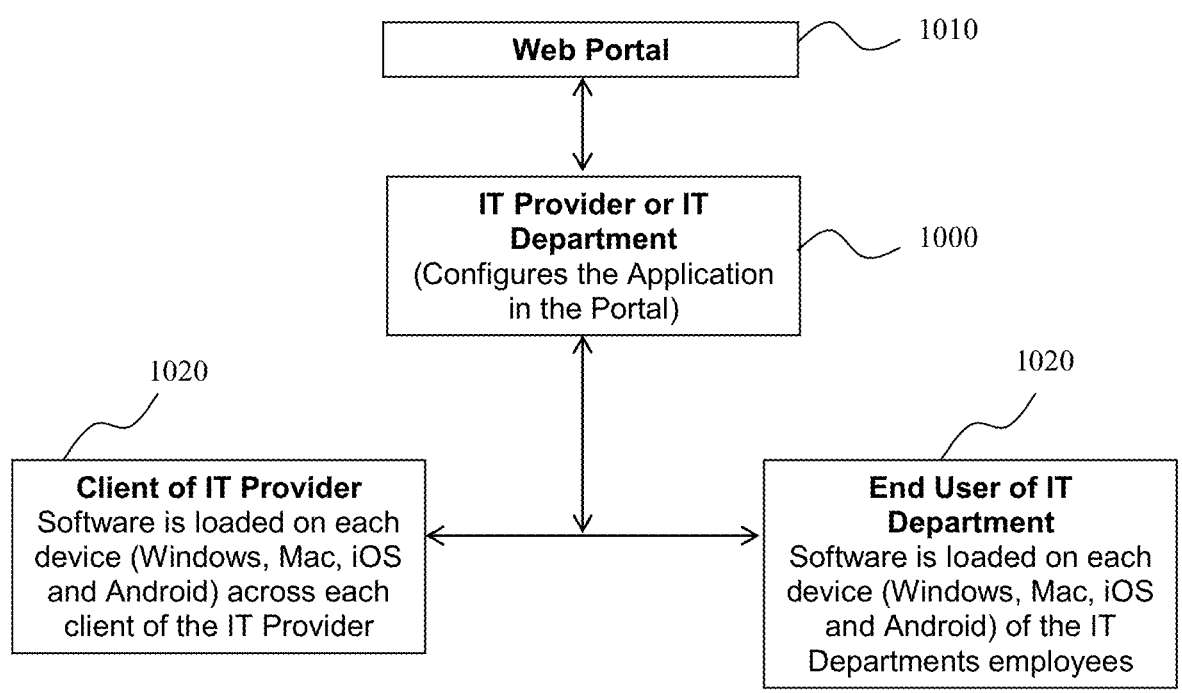
FIG. 10 is a schematic diagram illustrating the relationship between an IT provider or IT department, a web portal that enables configuration of an IT support software application, and clients or end users of the IT provider or IT department, according to an embodiment of the present invention.

FIG. 10 is a schematic diagram illustrating the relationship between an IT provider or IT department 1000, a web portal 1010 that enables configuration of an IT support software application, and clients or end users 1020 of the IT provider or IT department 1000, according to an embodiment of the present invention. As shown, the software operates as a 'native application', and not simply as a web portal, on the device(s) (such as Windows, Macintosh, iOS, and Android devices) of the clients or end users 1020 of the IT provider or IT department 1000, respectively. The software application is thus highly configurable down to a 'user/device' level.

Rather than merely directing clients and end users 1020 to a web portal that's configurable, embodiments of the present invention use the web portal 1010 to configure the native application residing on the device(s) of the clients or end users 1020. The IT provider or IT department 1000 thus can, for example, configure the buttons 305, 310, 315, 320, 325 shown on the GUI 300, or any of the GUI's 400, 500, 600, 700 described above.

In summary, advantages of some embodiments of the present inventive include a system with an end user graphical user interface that can be conveniently launched from a single application icon and that can be customised on an individual user or client basis to provide a locally-branded system for servicing individual departments' and users' IT needs.

Further advantageously, some embodiments of the software application can be installed on a number of employee devices such as desktops, laptops, tablets and smartphones so that an appropriate relevant device can conveniently lodge a service request.

A further advantage of some embodiments lies in the ability for users and customers to lodge a service request directly into an IT service management system without the need to physically visit or call to lodge a service request.

In a further advantage of some embodiments, a user can execute and access an application for lodging a service request without providing a user name or password, as activation of the executable icon present on the user's device automatically identifies the device and/or its associated user.

Further advantageously, according to some embodiments an entity provided with the software application, such as a third-party IT service provider or in-house IT department, can customise the appearance, features and layout of the end user graphical user interface to respond to individual needs and requirements.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

The invention is intended to embrace all alternatives, modifications, and variations of the present invention that have been discussed herein, and other embodiments that fall within the spirit and scope of the above described invention such as the ability for the third party IT service provider or in-house IT department to chat with the associated user using the invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

What is claimed is:

1. A system for providing information technology assistance via a native application resident and executable on an end user device over a network, the system comprising:
   a plurality of computer network processors connected to the network;
   computer memory operatively connected to the plurality of computer network processors, wherein the memory is configured to store computer program code for performing a process when executed by the plurality of computer network processors, the process comprising:
   providing, via a first entity, a software application to a second entity over the network, wherein the software application is customizable and defines an end user graphical user interface for installation on the end user device;
   customising, via the second entity accessing a web portal of the first entity, the software application including customising functions of the end user graphical user interface for requesting information technology assistance for the end user device, the functions being customized for the end user device to include at least one customised end user selectable buttons, wherein at least one of the customised buttons designates a specified service request for information technology assistance for the end user device;
   providing, via the second entity, the software application to the end user device over the network and installing the software application on the end user device, the software application being a native application resident and executable on the end user device and is not a web browser or software code inserted into an application;
   executing, via the end user device, the software application installed on the end user device, wherein the software application is executed by an executable icon for launching the end user graphical user interface;
   generating, via at least one of the customised functions of the end user graphical user interface of the software application, an electronic service request for information technology assistance for the end user device; and
   lodging, via the software application on the end user device, the service request with the second entity over the network.

2. The system of claim 1, wherein the first entity is a first computer system.

3. The system of claim 1, wherein the second entity is a second computer system.

4. The system of claim 1, wherein the end user device is at least one of a computing device, smartphone, desktop, laptop, and tablet.

5. The system of claim 1, wherein the process further comprises:

providing, via the second entity, in the software application a link to a knowledge database to the end user device over the network.

6. The system of claim 1, wherein the service request includes at least one of:
   a ticket type;
   user information;
   an attachment; and
   an issue description.

7. The system of claim 1, wherein the graphical user interface includes at least one of:
   customisable news articles;
   customisable app buttons;
   customizable forms;
   a customisable banner;
   a customisable colour scheme; and
   a customisable insignia associated with the second entity.

8. The system of claim 1, wherein the network includes the internet.

9. The system of claim 1, wherein the software application is configured to be installed on the end user device running an operating system including at least one of Windows, Android, iOS, and OSX.

10. The system of claim 1, wherein the service request further comprises information identifying the end user device automatically included by the software application.

11. The system of claim 1, wherein the functions for the end user device are customised in accordance with preferences of a user of the end user device.

12. A method for providing an information technology assistance via a native application resident and executable on an end user device over a network, the method comprising:
   providing, via a first entity, a software application to a second entity over the network, wherein the software application is customizable and defines an end user graphical user interface for installation on the end user device;
   customising, via the second entity accessing a web portal of the first entity, the software application including customising functions of the end user graphical user interface for obtaining information technology assistance for the end user device, the functions being customized for the end user device to include at least one customised end user selectable buttons, wherein at least one of the customised buttons designates a specified service request for information technology assistance for the end user device;
   providing, via the second entity, the software application to the end user device over the network and installing the software application on the end user device, the software application being resident and executable on the end user device and is not a web browser or software code inserted into an application;
   executing, via the end user device, the software application installed on the end user device, wherein the resident and native software application is executable by an executable icon on the end user device for launching the end user graphical user interface;
   generating, via at least one of the customised functions of the end user graphical user interface of the software application, an electronic service request for information technology assistance for the end user device; and
   lodging, via the software application on the end user device, the service request with the second entity over the network.

13. The method of claim 12, wherein the service request automatically identifies a user computing device.

14. The method of claim 12, wherein the network includes the internet.

15. The method of claim 12, wherein the software application is configured to be installed on the end user device running an operating system including at least one of Windows, Android, iOS, and OSX.

16. The method of claim 12, wherein the service request further comprises information identifying the end user device automatically included by the software application.

17. The method of claim 12, wherein the customising includes customising the functions of the end user device in accordance with preferences of a user of the end user device.

* * * * *